United States Patent [19]

Hjorring

[11] 4,447,909
[45] May 8, 1984

[54] CIRCUIT FOR RAPID RECOGNITION OF FSK SIGNALS IN A RADIO CHANNEL

[75] Inventor: Hans Hjørring, Sfrömmen, Norway

[73] Assignee: Siemens Aktiengesellschaft, Berlin and Munich, Fed. Rep. of Germany

[21] Appl. No.: 379,129

[22] Filed: May 17, 1982

[30] Foreign Application Priority Data

May 25, 1981 [DE] Fed. Rep. of Germany ....... 3120761

[51] Int. Cl.³ .............................................. H03K 9/06
[52] U.S. Cl. ...................................... 375/88; 375/103; 455/266
[58] Field of Search ...................... 375/88, 94, 96, 103, 375/82; 358/904; 455/177, 200, 266

[56] References Cited

U.S. PATENT DOCUMENTS 3,909,735  9/1975  Anderson et al. .................. 455/266
4,254,504  3/1981  Lewis et al. ......................... 455/200
4,352,208  9/1982  Schroeder ........................... 455/266
4,356,567  10/1982  Eguchi et al. ..................... 435/177

Primary Examiner—Robert L. Griffin
Assistant Examiner—Stephen Chin
Attorney, Agent, or Firm—Hill, Van Santen, Steadman & Simpson

[57] ABSTRACT

A circuit arrangement provides that false lock-in of the phase locked loop caused due to noise in a radio channel given pre-emphasis and de-emphasis is avoided and short transfer times can be obtained between the individual channels. To this end, a full-wave rectifier has a following transfer switch connected to a frequency shift keying demodulator having a phase locked loop. A high-pass filter is connected as a compensation filter in one branch and the incoming frequency shift keyed signal is directly connected to the demodulator over a second branch after it has been recognized.

1 Claim, 3 Drawing Figures

CIRCUIT FOR RAPID RECOGNITION OF FSK SIGNALS IN A RADIO CHANNEL

BACKGROUND OF THE INVENTION

1. Field of the Invention

The present invention relates to a circuit for rapid recognition of frequency shift keyed (FSK) signals in a radio channel given pre-emphasis and de-emphasis.

2. Description of the Prior Art

A phase locked loop (PLL) is generally employed for detecting the FSK signal in a radio channel. With the use of a quadrature detector as the locked detector and with integration at the output, the circuit emits an output signal when it has been locked onto an input signal. The criterion for the lock-on is that the input signal lies above a specific value and, moreover, it is located within a specific frequency band around the center frequency of the phase locked loop. This frequency band is thereby fixed by the loop amplification and by the loop attenuation factor of the phase locked loop which are, in turn, determined by the baud value of the frequency deviation of the FSK data signal.

When no radio frequency signal is received by the antenna input of a radio receiver, a white noise will occur at the audible output in accordance with the thermal noise generated in the receiver when no filtration occurs. In most frequency modulation (FM) radio systems, the audible output is filtered with a low-pass filter of the first order with a frequency cutoff at a few 100 Hz, the so-called de-emphasis. In the transmitter, the audible signal is filtered with a high-pass filter, the so-called pre-emphasis, in order to obtain a flat signal curve in the overall system.

The de-emphasis in the receiver is usually the cause of the pink noise energy (i.e. +6 dB/octave) in the demodulated data channel when no radio frequency signal is received by the antenna input of the receiver. As a result, the phase locked loop is locked onto the noise for a rather long period. Unless the lock detector output is integrated over a rather long period, this will cause an erroneous lock-on to the noise.

In specific instances, a long integration time can be unacceptable in a radio system because the time available for transferring from one channel to the next is very short.

SUMMARY OF THE INVENTION

The object of the present invention is to provide a solution with which the aforementioned problem can be eliminated in a simple manner.

The above object is achieved, according to the present invention, in such a manner that a full-wave rectifier having a following transfer device is preconnected to a FSK demodulator having a phase locked loop, lying parallel at the input side, and in whose one branch a high-pass filter is connected as a compensation filter and over whose second branch the incoming FSK signal is connected directly to the FSK demodulator after it has been recognized.

It is provided, in accordance with a further advantageous feature of the invention, that the high-pass filter exhibit a cutoff frequency which lies above the upper cutoff frequency of the audible channel.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
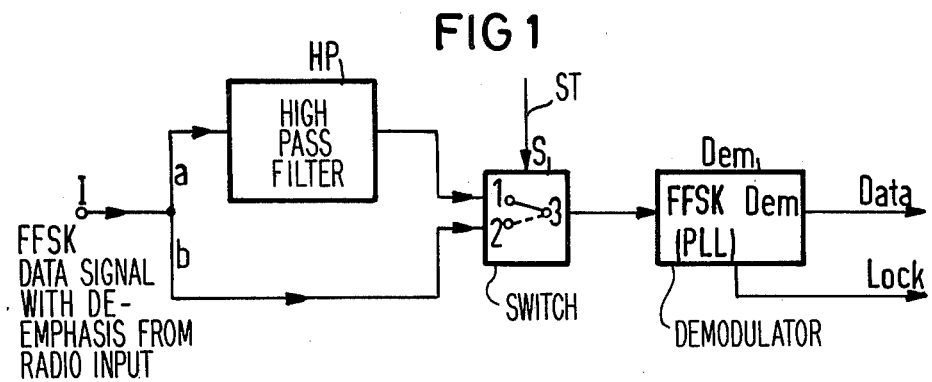
FIG. 1 is a block diagram representation of a circuit constructed in accordance with the present invention.

In the block diagram representation of FIG. 1, an input I receives the FSK data signal with de-emphasis from a receiver. In the exemplary embodiment, thereby, it is a matter of a FFSK signal (fast frequency shift keying) in which the change always occurs in the zero crossing. After the circuit input, a separation of the transmission path occurs into a full-wave rectifier of which the one branch a, the so-called search branch, contains a high-pass filter HP of the first order as a compensation filter whose output is connected to the one contact 1 of a transfer device S, and the other branch b is directly connected as a normal transmission path to a second terminal 2 (dot-dash illustration) of the transfer device S. At its contact 3, the switch S is connected to the following FFSK demodulator which is provided with a phase locked loop PLL which is illustrated by an arrow having the designation Lock. The demodulated data (arrow designated "Data") are taken from the FFSK demodulator.

Figure 3:
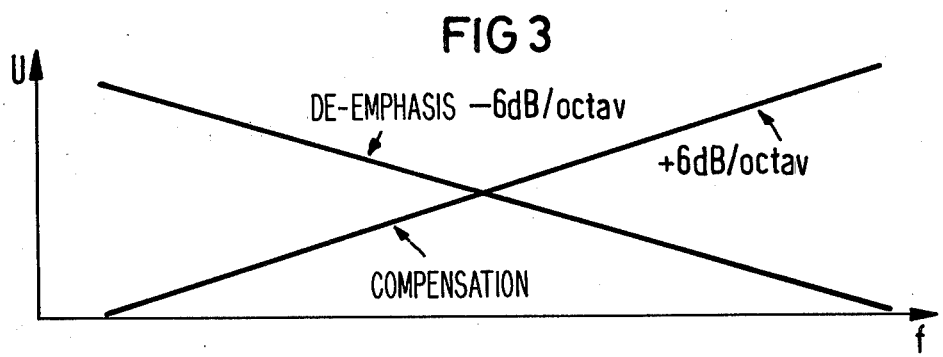
FIG. 3 is a graphic illustration of the frequency dependency of the de-emphasis in the receiver and of the compensation circuit.

The manner of operation of the circuit described above is described below. In the switch position 1 of the transfer switch S ("search of the data signaling"), the audible output from the receiver is filtered in the high-pass filter HP having a cutoff frequency which lies above the upper cutoff frequency of the audible channel. The filter HP cancels the de-emphasis function, and thus operates as a compensation circuit (cf. in this regard, the frequency curve in FIG. 3). By so doing, one obtains a white noise spectrum. This is very difficult for the phase locked loop to fix, i.e. lock onto. Therefore, the integration time of the lock detector can be made much shorter than without this circuit. Therefore, the present invention makes it possible to reduce the undesirably-long integration time.

Upon recognition of the FFSK data signalization of the lock detector, the high-pass filter HP is switched off by the application of a control signal ST to the transfer switch S and the phase locked loop PLL operates in the standard manner in the demodulation process.

Figure 2:
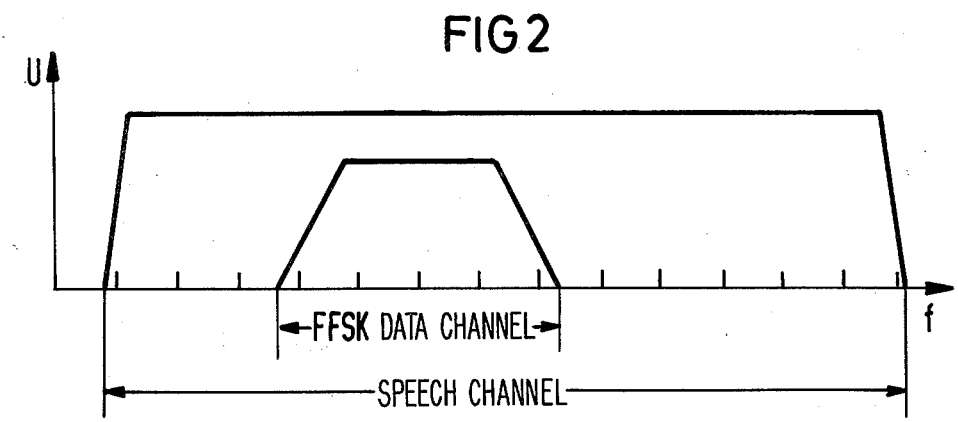
FIG. 2 illustrates the arrangement of the FSK data channel in the speech channel, in graphic form.

The voltage of the audio level is entered in a diagram in accordance with FIG. 2 with respect to frequency. It can thereby be seen how the FFSK data channel of a lower band width is inserted within the speech channel.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art. I claim:

1. A circuit arrangement for the rapid recognition of frequency shift keying signals in a radio channel given pre-emphasis and de-emphasis, comprising:
   a fast frequency shift keying demodulator including an input, a data output and a lock output;
   said demodulator including a phase locked loop circuit;
   a circuit input for receiving the fast frequency keyed signals;
   a first branch connected to circuit input and including a high-pass filter having a structure to provide a cutoff frequency which lies above the upper cutoff frequency of the audible channel, and a second branch connected to said circuit input; and
   a switch including first and second inputs, and an output connected to said input of said fast frequency keying demodulator, said first input connected to said high-pass filter and said second input connected to said second branch for directly receiving said fast frequency shift keyed signals from said circuit input.

* * * * *